United States Patent

Edwards et al.

[11] Patent Number: 5,926,596
[45] Date of Patent: Jul. 20, 1999

[54] OVERMOLDED ALIGNMENT FERRULE

[75] Inventors: Bryan Thomas Edwards, Camp Hill; Robert Leon Mansberger, II, Middletown, both of Pa.

[73] Assignee: The Whitaker Corporation, Wilmington, Del.

[21] Appl. No.: 09/014,209

[22] Filed: Jan. 28, 1998

[51] Int. Cl.$^6$ .................................................. G02B 6/36
[52] U.S. Cl. .................................................. 385/78
[58] Field of Search ............................ 385/60, 78, 88, 385/56, 58, 147; 250/227.11; 264/1.25, 328.1; 65/387

[56] References Cited

U.S. PATENT DOCUMENTS

| | | | |
|---|---|---|---|
| 4,759,599 | 7/1988 | Yamaguchi et al. | 350/96.21 |
| 5,044,720 | 9/1991 | Haley et al. | 385/88 |
| 5,093,878 | 3/1992 | Haley et al. | 385/78 |
| 5,287,426 | 2/1994 | Shahid | 385/85 |
| 5,375,183 | 12/1994 | Edwards et al. | 385/60 |
| 5,604,830 | 2/1997 | Kuder et al. | 385/59 |
| 5,685,727 | 11/1997 | Cairns | 385/56 |

*Primary Examiner*—Akm E. Ullah
*Attorney, Agent, or Firm*—June B. Schuette

[57] ABSTRACT

An overmolded alignment ferrule for a fiber optic device used to couple a plurality of optical fibers contained therein to an other fiber optic device. The overmolded alignment ferrule comprises a precision portion for aligning the optical fibers with the other fiber optic device, and an overmolded body portion extending rearward from the precision portion for incorporating the alignment ferrule into the fiber optic device. The precision portion may define a plurality of first guide pin channels for receiving guide pins and a plurality of first fiber channels for receiving the optical fibers. The overmolded body portion may define a plurality of second guide pin channels in communication with the first guide pin channels and at least two second fiber channels. Each second fiber channel is in communication with a respective one of the first fiber channels. In producing the precision portion, the first guide pin channels are desirably used as datum in defining with precision the first fiber channels.

27 Claims, 4 Drawing Sheets

OVERMOLDED ALIGNMENT FERRULE

FIELD OF THE INVENTION

The present invention relates to alignment ferrules used in optical fiber connectors for aligning optical fibers with other fiber optic devices.

BACKGROUND

A fiber optic connector for connecting an optical fiber to an optical fiber of an other fiber optic device usually includes an alignment ferrule. The fiber optic connector typically utilizes the precise dimensions of the alignment ferrule to align with precision the optical fiber therein with the optical fiber of the other mating fiber optic device. Alignment ferrules often include a high precision front section that is concentric with a central passage in which the optical fiber is held, whereby orientation of the front section also orientates the corresponding optical fiber. In producing such a precision portion, the outer cylindrical wall of the high precision front section is usually used as datum to define the concentric central passage with precision and in a cost efficient manner. A lower precision body portion is often used to incorporate the alignment ferrule into the fiber optic connector. These ferrules may be used either singularly or in conjunction with others.

Alignment ferrules have been manufactured using a variety of methods to achieve the high precision at the front section, while realizing cost savings through the lower precision requirements of the body portion. U.S. Pat. No. 4,634,214, for example, discloses a two-piece ferrule where the front section is a cylindrical ceramic piece that is frictionally fit or bonded within a collar of a lower precision rear section.

U.S. Pat. No. 5,013,122 discloses a ferrule that is made from metal or thermoplastic material having the high precision front section and the body portion integrally formed. A bipartite ferrule may also be produced by attaching the front section to the rear body portion through the use of mechanical means, such as threads or bosses, or through bonding means, such as the use of heat, ultrasonic, or adhesive techniques. A ferrule made from injection molded plastic is disclosed in U.S. Pat. No. 4,834,487. This is a one-piece ferrule that has a precision front section and a body portion formed such that the precision front section is free of molding flash.

The ferrules disclosed in the above patents have a number of drawbacks for high volume production. Although the one-piece ferrules have the necessary structural integrity, their production processes are limited by the high precision required at the front section. The two-piece ferrules allow the manufacturing process and materials selection to be tailored to the particular sections of the ferrule, allowing for optimization of the manufacturing process. However, the two-piece ferrules require joining features, such as threads, bores, or bosses, be incorporated. These additional features can impose the same precision requirements on the rear body section that were trying to be avoided.

U.S. Pat. No. 5,375,183, on the other hand, discloses an overmolded alignment ferrule that may be produced economically and in high volume, while taking advantage of the different precision and material requirements of the front section versus the rear body section and still maintaining the precision required at the front section so that the optical fiber therein may be reliably coupled to the fiber optic device. The overmolded alignment ferrule of this invention may be used in fiber optic connectors to couple an optical fiber therein to an other fiber optic device.

The overmolded alignment ferrule of the '183 patent has a preformed precision portion having a front section for aligning the optical fiber therein with the fiber optic device, and an overmolded body portion configured for incorporating the alignment ferrule into the fiber optic connector. The precision portion also has a rear section, rearward of the front section, having an anti-displacement feature thereupon and d central passage extending therethrough for positioning the optical fiber concentrically with the front section. The body portion also extends rearwardly from the precision portion and is configured to incorporate the alignment ferrule into the particular connector. The body portion has a fiber receiving opening in communication with the central passage of the precision portion to guide the optical fiber thereto.

Even though the device of the '183 patent is a significant improvement over the prior devices, it has some limitations. For example, the geometry of the high precision portion may be limited because, as with prior devices, the high precision portion is produced by using its cylindrical outer wall as datum for defining with precision the fiber channel or bore, which extends concentrically with the outer wall. Accordingly, it would be difficult to modify in a cost-effective way the '183 device to accommodate more than one fiber channels or any other channels.

Accordingly, it is an object of the present invention to provide an overmolded alignment ferrule for aligning a plurality of optical fibers with a mating fiber optic device.

It is a further object of the present invention to provide such an overmolded alignment ferrule including a precision portion having guide pin channels defined therein that are used as datum for defining fiber channels therein with precision and preferably without reliance upon any external datum of the precision portion.

It is a further object of the present invention to provide such an alignment ferrule that enables core pins to be used in producing the precision portion that are relatively short and therefore better able to minimize deflection of the core pins during the molding or other production process. It is a further object of the present invention to provide such an alignment ferrule wherein the precision portion can be produced with a minimal amount of material.

SUMMARY OF AN EMBODIMENT OF THE INVENTION

In accordance with these and other objects, the present invention provides an overmolded alignment ferrule for a first fiber optic device used to couple a plurality of optical fibers contained therein to a second fiber optic device. The first and second fiber optic devices desirably are each in the form of an optical fiber connector.

The overmolded alignment ferrule of the present invention comprises a precision portion for aligning the optical fibers with the second fiber optic device, and an overmolded body portion extending rearward from the precision portion for incorporating the alignment ferrule into the first fiber optic device. The precision portion defines at least one first guide pin channel and a plurality of first fiber channels. The first guide pin channel desirably is adapted to receive a guide pin for mating with the second fiber optic device, and each first fiber channel receives a respective one of the optical fibers. The overmolded body portion defines at least one second guide pin channel in communication with the first guide pin channel and at least two second fiber channels. Each second fiber channel is in communication with a respective one of the first fiber channels.

In a preferred embodiment, the precision portion is in the form of a generally rectangular alignment block, and may include one or more gripping members for gripping the overmolded body portion to facilitate a secure engagement between the precision portion and the overmolded body potion. The gripping members may be in the form of any type of surface irregularity, but desirably are in the form of flanges formed on the end surfaces of the precision portion. The precision portion may be constructed of a thermoset material or any other suitable material, and the overmolded body portion may be constructed of thermoplastic or any suitable material.

In producing the precision portion, the first guide pin channel desirably is used as datum in defining with precision the first fiber channels. In this regard, the precision portion desirably defines a plurality of first guide pin channels, which are positioned and dimensioned in a predetermined manner to facilitate readily defining the first fiber channels with precision. In a preferred embodiment, wherein the precision portion defines two first guide pin channels, the line defined between the first guide pin channels may be used as a basis for the positioning of the first fiber channels. The first guide pin channels and the first fiber channels desirably are parallel to each other and each have a center defined by its respective longitudinal axis. All or some of the centers of the first fiber channels are co-linear with respect to each other. If desired, the centers of the first guide pin channels may also be co-linear with the centers of the first fiber channels. If only one first guide pin channel is defined in the precision portion, a rotational alignment device or the like may be used during production to limit rotation and facilitate use of the one first guide pin channel as the datum in defining the first fiber channels.

Accordingly, due to their alignment and their predetermined diameters, the first guide pin channels enable the positioning of the first fiber channels to be determined with precision. Thus, when producing the precision portion, there is no need to use or rely upon any external datum of the precision portion to define the positioning of the first fiber channels.

As a result, the amount of material necessary to mold the precision portion is reduced because the positioning of the first fiber channels is based upon the positioning and the diameters of the first guide pin channels. The amount of material necessary to produce the precision portion therefore may be based upon the amount of material necessary to define the first guide pin channels and the first fiber channels, the tooling and mold requirements, and any desired geometry of the precision portion. Additionally, in accordance with the invention, the precision portion can be relatively thin and, as a result, the core pins necessary to define the first guide pin channels and the first fiber channels can be relatively short. Shorter core pins are desirable because they are less likely to deflect and therefore more capable of higher precision than longer core pins. This is because, similar to the principles of a cantilever beam, under a given load the length of a core pin determines the amount of deflection of the core pin.

Accordingly, in accordance with a preferred embodiment of the invention, the first guide pin channels perform several functions. The first guide pin channels are adapted to house guide pins for mating with other fiber optic devices or to receive guide pins from other fiber optic devices for mating with the other fiber optic devices. Additionally, the location and dimensions of the first guide pin channels are used as datum for defining with precision the location of the first fiber channels. Still further, the first guide pin channels can also be used in the production of the overmolded body portion as datum for defining the one or more second guide pin channels and the second fiber channels.

The present invention also includes a method of producing the overmolded alignment ferrule comprising the steps of: (a) producing the precision portion that defines the at least one first guide pin channel and the at least two first fiber channels desirably such that the first guide pin channel is used as datum for defining the first fiber channels with precision; and (b) overmolding the precision portion to produce the overmolded body portion for incorporating the overmolded alignment ferrule into the second fiber optic device such that the body portion extends rearward from the precision portion and defines the at least one second guide pin channel and the second fiber channels. Preferably, the precision portion is produced with two first guide pin channels and the overmolded body portion is produced with two second guide pin channels; and the centers of the first fiber channels are co-linear with each other and, if desired, with the centers of the first guide pin channels. The precision portion may be produced by conventional molding process or in any other suitable manner, and the overmolded body portion can be produced by conventional thermoplastic injection molding or in any other suitable manner.

The present invention enables the production of the precision portion whereby the precision positioning of its fiber channels may be accomplished without reliance upon external datum of the precision portion. Instead, with the present invention, the precise positioning of the fiber channels may be based upon the location, number and dimensions of its guide pin channels. As a result, the precision portion can be produced with a minimum amount of material, and the channels of the precision portion can be defined with relatively short core pins.

BRIEF DESCRIPTION OF DRAWINGS

The present invention and the advantages thereof will become more apparent upon consideration of the following detailed description when taken in conjunction with the accompanying drawings in which.

DETAILED DESCRIPTION OF THE PREFERRED EMBODIMENTS

Figure 1:
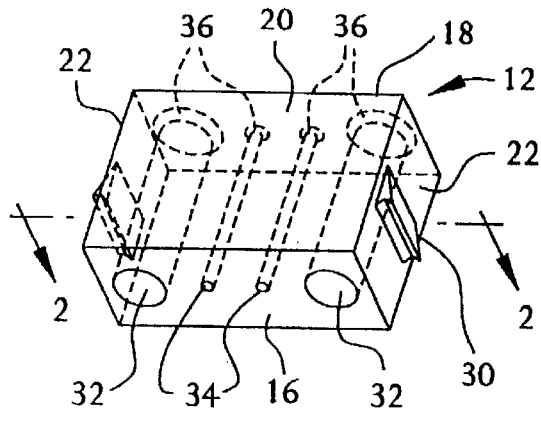
FIG. 1 is a perspective view of a precision portion of an overmolded alignment ferrule in accordance with one embodiment of the invention, illustrating with broken lines the guide pin channels and the fiber channels defined therein.
Figure 2:
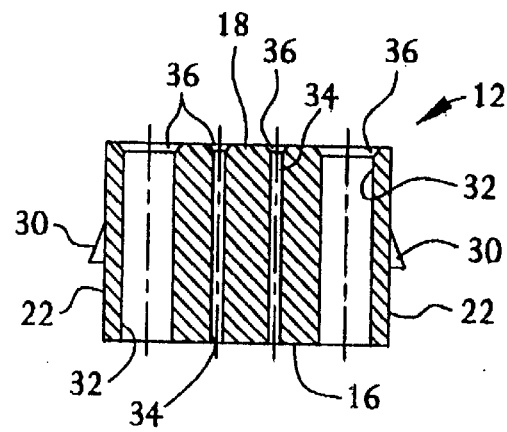
FIG. 2 is a cross section view taken along lines 2—2 of FIG. 1.
Figure 3:
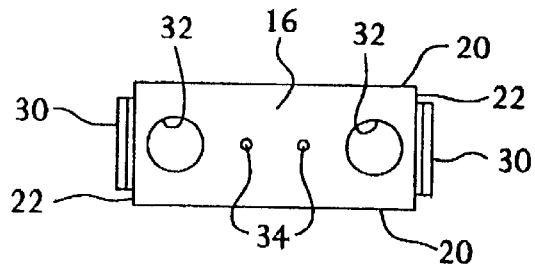
FIG. 3 is a plan view of the front face of the precision portion of FIGS. 1 and 2.
Figure 4:
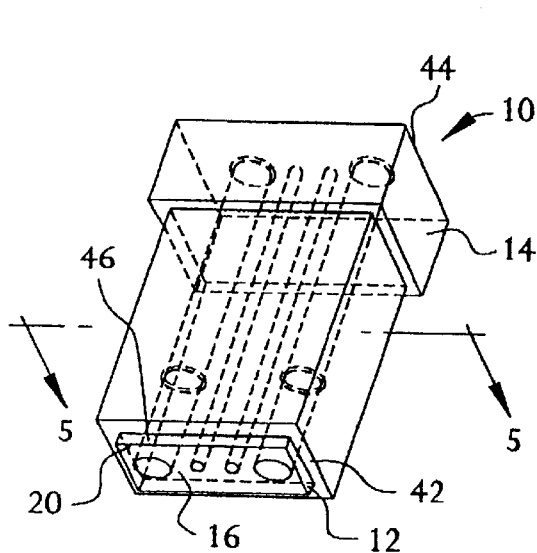
FIG. 4 is a perspective view of the overmolded alignment ferrule in accordance with one embodiment of the invention including the precision portion of FIGS. 1–3, illustrating with broken lines the guide pin channels and the fiber channels of the precision portion and the overmolded body portion.
Figure 5:
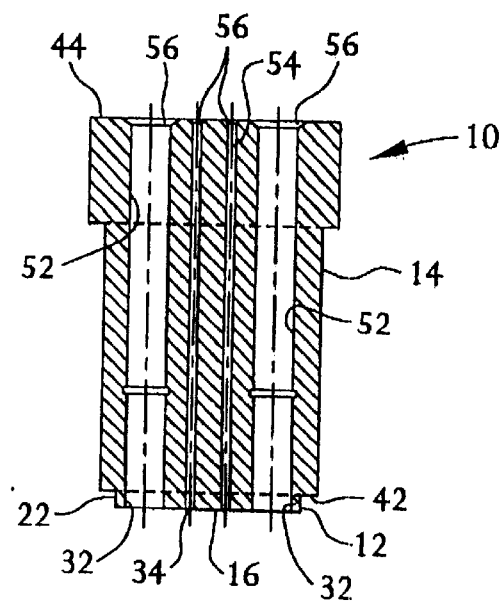
FIG. 5 is a cross section view taken along lines 5—5 of FIG. 4.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

An overmolded alignment ferrule 10 in accordance with a preferred embodiment of the invention comprises a precision portion in the form of an alignment block 12 and an overmolded body portion 14. The alignment block 12 illustrated in FIGS. 1–5 is generally rectangular and has a generally flat front face 16, a generally flat rear face 18, a pair of generally flat side surfaces 20, and a pair of generally flat end surfaces 22. The alignment block 12 may include one or more gripping members for gripping the overmolded body portion 14 to prevent displacement of the alignment block 12 relative to the overmolded body portion. In the illustrated embodiment, the gripping members are in the form of flanges 30 formed on the end surfaces 22 of the alignment block 12. Each of the illustrated flanges 30 is generally V-shaped.

The illustrated alignment block 12 defines a pair of guide pin channels 32 adapted to receive guide pins and a pair of fiber channels 34 for receiving optical fibers. The illustrated guide pin channels 32 and the fiber channels 34 of the alignment block 12 are parallel to each other and extend the entire length of the alignment block. The alignment block 12 may include chamfers 36 at the rear face of the alignment block 12 around each of the guide pin channels 32 to facilitate receipt of guide pins and around each of the fiber channels 34 to facilitate receipt of the optical fibers.

Each of the guide pin channels 32 and fiber channels 34 of the alignment block 12 has a center defined by its respective longitudinal axis. The guide pin channels 32 and the fiber channels 34 may have any suitable predetermined locations and dimensions. In the illustrated embodiment, for example, the centers of the guide pin channels 32 and the fiber channels 34 of the alignment block 12 are all substantially aligned in a co-linear manner.

The nominal spacing between the centers of the two fiber channels 34 of the illustrated alignment block 12 is desirably 750 microns, and the nominal spacing between the centers of the two guide pin channels 32 of the alignment block is desirably 2600 microns. Additionally, the nominal spacing between one of the guide pin channels 32 and an adjacent fiber channel 34 of the alignment block 12 is 925 microns, and is substantially the same as the nominal spacing between the other guide pin channel of the alignment block and its adjacent fiber channel. The nominal diameters of each of the guide pin channels 32 and fiber hole channels 34 of the alignment block 12 desirably are 700 microns and 125 microns, respectively. The nominal length of the front and rear faces 16 and 18 of the alignment block 12 may be 3700 microns; the nominal length of the end surfaces 22 may be about 2500 microns; and the nominal width of the front and rear faces may be about 1600 microns.

In accordance with alternative embodiments, the alignment block 12 may define additional fiber channels 34. For example, the alignment block 12 may define four, six, eight, ten or more fiber channels 34, which desirably have centers that are co-linear with each other and with the centers of one or more guide pin channels 32. The desired number of fiber channels 34 and the relative spacing and dimensions of the fiber and guide pin channels of the various alternative embodiments may depend upon the application of the invention.

In accordance with further alternative embodiments of the invention, the centers of the guide pin channels 32 of the alignment block 12 do not need to be co-linear with the centers of the two or more fiber channels 34 of the alignment block. Additionally, if desired, the alignment block 12 may include some fiber channels 34 that are not co-linear with respect to all of the other fiber channels. For example, in a multi-row embodiment of the invention, the alignment block 12 may define two or more rows of fiber channels, with the guide pin channels of the alignment block used as the datum for defining the two or more rows. In this embodiment, preferably, neither row of fiber channels of the alignment block is co-linear with the guide pin channels, and the line between the first guide pin channels may be used as the basis for determining the "north-south" positioning of each row relative to the line.

The overmolded body portion 14 may have any suitable configuration depending on the configuration of the fiber optic connector. The illustrated overmolded body portion 14, for example, is configured to be incorporated in the fiber optic device illustrated in FIGS. 6 and 8 which is in the form of a plug 40 adapted to mate with a receptacle 58 and a similar plug 40. In accordance with this embodiment, the overmolded body portion 14 has a generally T-shaped configuration including a front face 42 and a rear face 44, and defines a bore 46 for receiving the alignment block 12.

The overmolded body portion 14 also defines a pair of guide pin channels 52 in communication with the guide pin channels 32 of the alignment block 12, and a pair of fiber channels 54 in communication with the fiber channels 34 of the alignment block 12. The rear face 44 of the overmolded body portion 14 has chamfers 56 around each of its guide pin channels 52 to facilitate receipt of guide pins and around each of its fiber channels 54 to facilitate receipt of the optical fibers.

In the illustrated embodiment, the guide pin channels 52 and fiber channels 54 of the overmolded body portion 14 are parallel to each other, and each also has a center defined by its longitudinal axis, all of which are substantially aligned in a co-linear manner. The diameters and the spacing between the centers of the various channels 52 and 54 of the overmolded body portion 14 are substantially the same as the diameters and the spacing between the centers of the various channels 32 and 34 of the alignment block 12, except that less precision is required. The nominal length of the rear face 44 of the overmolded body portion may be about 5000 microns and the nominal length of the front face of the overmolded body portion may be about 4350 microns. The nominal length of the overmolded body portion 14 may be about 7700 microns.

The guide pins are preferably received within the first and second guide pin channels 32 and 52 for mating with an other fiber optic connector. For a male overmolded alignment ferrule 10, the guide pins may be secured or positioned relative to the overmolded alignment ferrule by a guide pin clip or in any suitable manner. The female overmolded alignment ferrule 10, on the other hand, is configured in any suitable manner to receive and engage guide pins of the male overmolded alignment ferrule 10. The optical fibers preferably include a buffer coated portion, and a bare portion received within the first and second fiber channels 34 and 54.

The overmolded alignment ferrule 10 in accordance with the present invention can be produced in any suitable manner. In a preferred embodiment, for example, the alignment block 12 of the overmolded alignment ferrule 10 is first produced and then the overmolded body portion 14 is produced by overmolding upon the alignment block 12. The alignment block 12 desirably is produced by conventional molding process. During production, its guide pin channels 32 are used as datum to determine the positioning of its fiber channels 34 and the required positioning of its guide pin channels and its fiber channels is maintained by exacting tooling dimensions and short tooling component length.

After the alignment block 12 is produced, it is positioned and clamped for the overmolding process in which the overmolded body portion 14 is formed by encapsulating the alignment block. This process can be accomplished in any suitable manner, such as, for example, conventional thermoplastic injection molding. This process combines the functional positioning of the alignment block 12 with the geometrical requirements for use in the fiber optic connector system.

During the overmolding process, the guide pin channels 32 and the first fiber channels 34 of the alignment block 12 should be sealed from the overmolding encapsulating compound in any suitable manner. For example, a diametrical interference may be provided between the guide pin molding core and the guide pin channels 32, and a pin having a small conical taper can be used to seal the fiber channels 34 from the encapsulating compound. Additionally, the alignment block 12 desirably is made of a material that melts at a temperature above the application temperature of the encapsulating compound or a material that is not influenced by the encapsulating material temperature such as, for example, metal, ceramic, or thermoset composite material.

Figure 6:
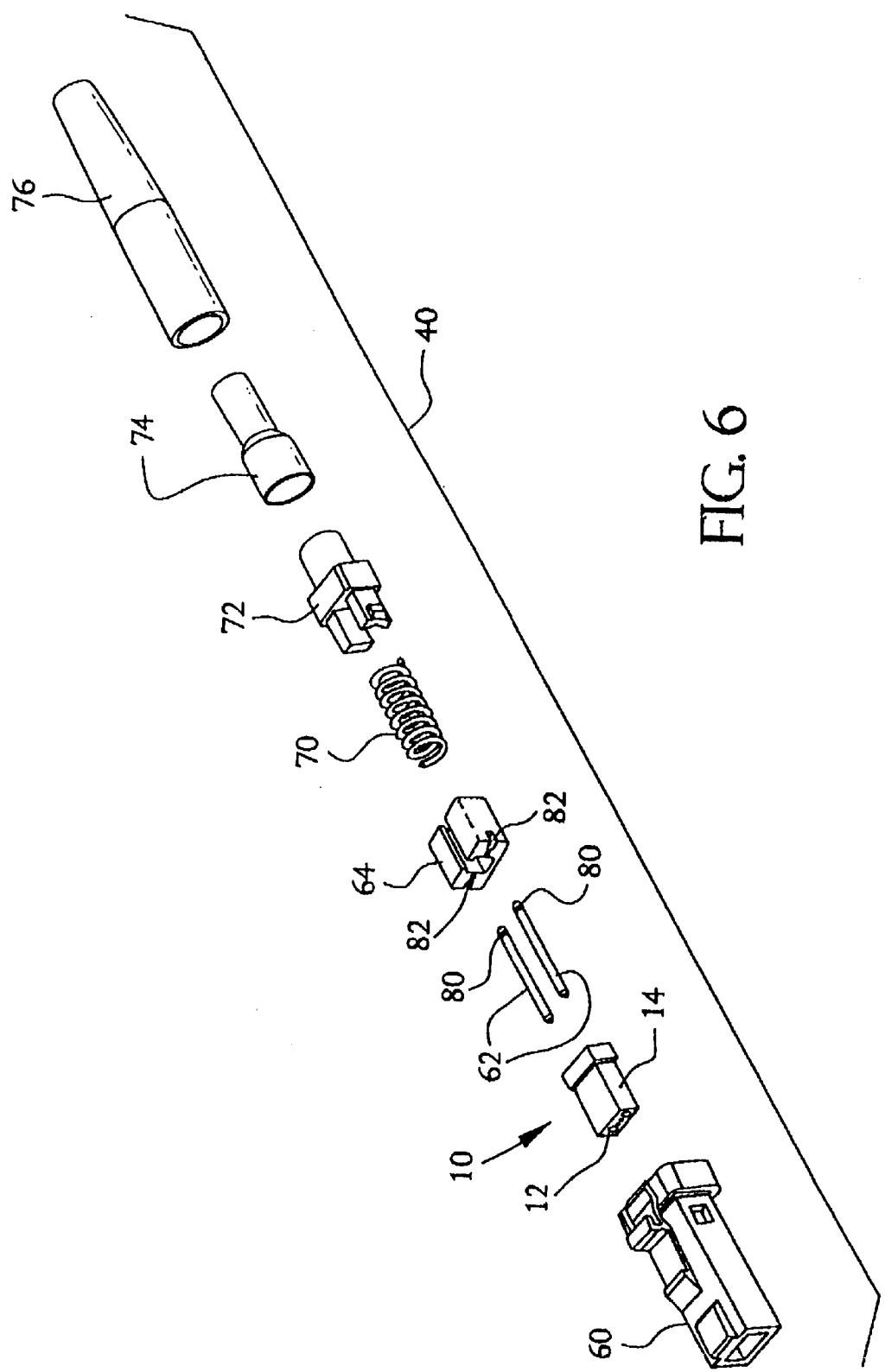
FIG. 6 is an exploded perspective view of the components of a fiber optic device incorporating the overmolded alignment ferrule of FIGS. 4–5 in the form of a plug received by a housing and adapted to mate with a similar fiber optic device.
Figure 8:
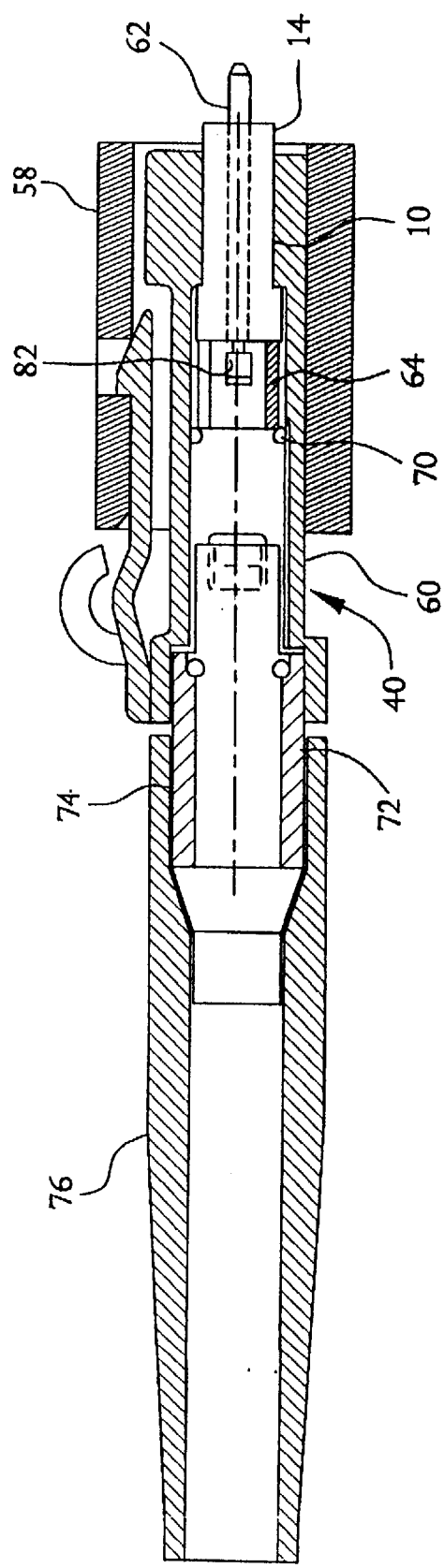
FIG. 8 is an assembled, cross-sectional view of the components of FIG. 6, also including a receptacle receiving the connector.

The illustrated overmolded alignment ferrule 10 is adapted to be incorporated within the plug 40 of FIGS. 6 and 8, which may be used to hold a conventional fiber optic cable and to mate with the receptacle 58 and a similar plug or any other suitable fiber optic device. The illustrated plug 40 is received by the receptacle 58 and includes the connector 60, the overmolded alignment ferrule 10, guide pins 62, a U-shaped guide pin clip 64 for securing the guide pins 62 relative to the overmolded body portion 14, a coiled spring 70, a spring push member 72, a crimpable eyelet 74 and a strain relief boot 76. The overmolded alignment ferrule 10 and the guide pin clip 64 are mounted within a forward end of the connector 60. The coiled spring 70 is mounted within the connector 60 and between the spring push member 72 and the guide pin clip 64. The crimpable eyelet 74 is mounted on the spring push member 72 and finally, the strain relief boot 76 is connected to the crimpable eyelet.

Figure 7:
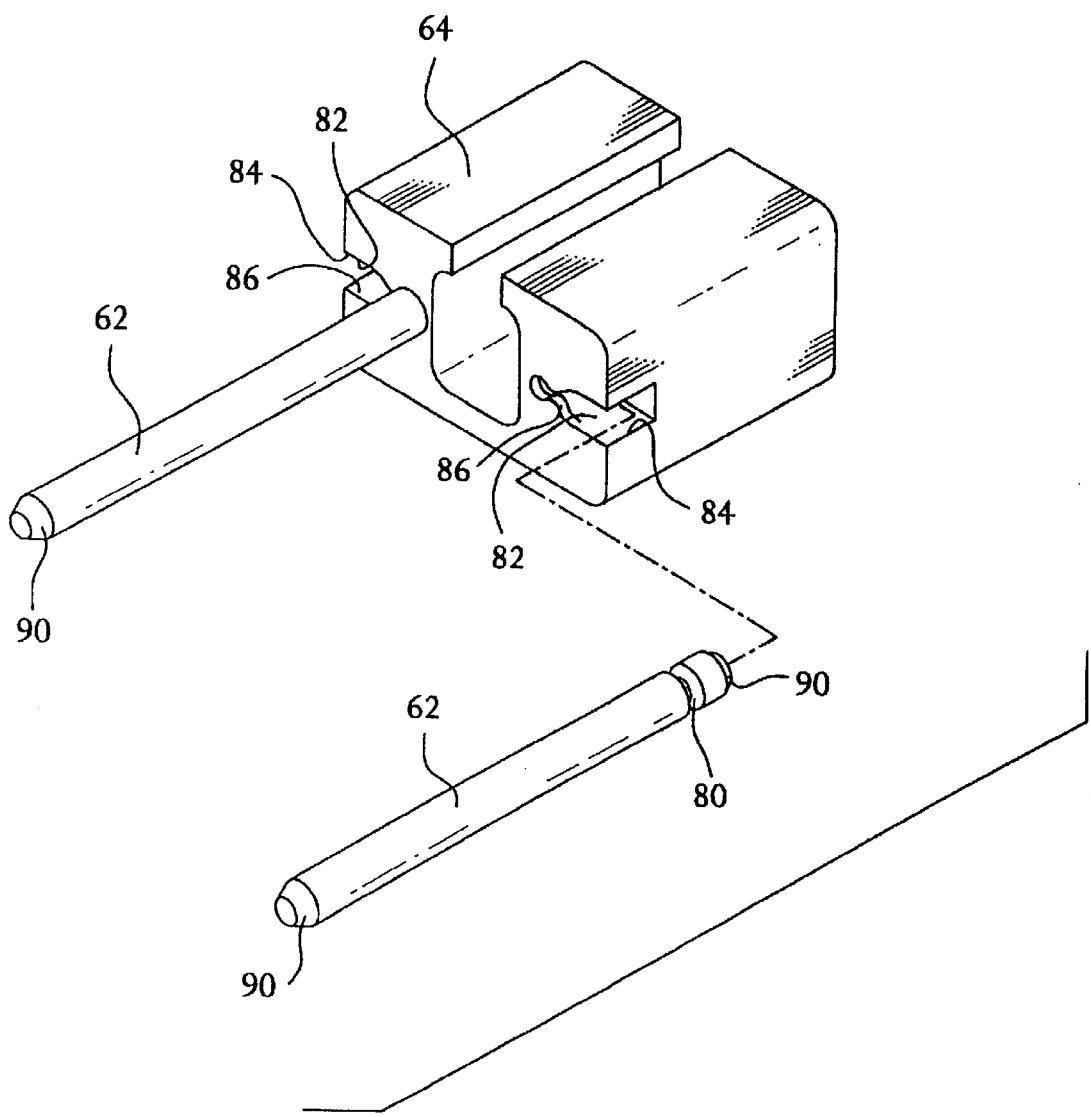
FIG. 7 is a perspective view of the guide pin clip and guide pins of the fiber optic device of FIG. 6, illustrating one of the guide pins received by the guide pin clip and the other guide pin removed from the guide pin clip.

The guide pins 62 may comprise any suitable structure and may engage the guide pin clip 64 in any suitable manner. In the illustrated embodiment, for example, each guide pin 62 includes a reduced diameter or neck portion 80 and the guide pin clip 64 defines a pair of bores 82, with each bore being generally rectangular and including an open side portion 84 and an open front portion 86. The open front portions 86 of the bores 82 are key shaped so that the neck portions 80 of the guide pins 62 can be received within the open front portions and so that the guide pin clips 62 can engage the guide pins 62 within the open front portions by snap fit. The ends 90 of the illustrated guide pins 62 are chamfered. (See FIGS. 6–8).

The plug 40 illustrated in FIGS. 6 and 8 is an example of a connector in which the ferrule according to the terms of the present invention can be incorporated. Other known connectors and connectors not known that make use of an MT or Mini-MT style ferrule may also benefit from use of this ferrule according to the terms of the present invention as a replacement ferrule. Advantageously, few, if any, modifications to the connector are necessary to make use of the ferrule according to the terms of the present invention.

Accordingly, the present invention enables the production of the alignment block 12 whereby the precision positioning of its fiber channel 34 may be accomplished without reliance upon external datum of the alignment block. Instead, with the present invention, the precise positioning may be based upon the location, number and dimensions of its guide pin channels 32. As a result, the alignment block 12 can be produced with a minimum amount of material, and the channels 32 and 34 of the alignment block 12 can be defined with relatively short tooling core pins.

The foregoing description is for purposes of illustration only and is not intended to limit the scope of protection accorded this invention. The scope of protection is to be measured by the following claims, which should be interpreted as broadly as the inventive contribution permits.

The claimed invention is:

1. An overmolded alignment ferrule for a first fiber optic device used to couple a plurality of optical fibers contained therein to a second fiber optic device, the overmolded alignment ferrule comprising:

(a) a precision portion for aligning the optical fibers with the second fiber optic device, the precision portion defining at least one first guide pin channel and at least two first fiber channels, the first guide pin channel adapted to receive a guide pin for mating with the second fiber optic device, and each first fiber channel receiving a respective one of the optical fibers; and (b) an overmolded body portion for incorporating the alignment ferrule into the first fiber optic device and extending rearward from the precision portion, the overmolded body portion defining at least one second guide pin channel in communication with the first guide pin channel and at least two second fiber channels, the second guide pin channel adapted to receive the guide pin, each second fiber channel being in communication with a respective one of the first fiber channels and receiving the respective one of the optical fibers.

2. The overmolded alignment ferrule of claim 1 wherein the precision portion defines two first guide pin channels, the first guide pin channels and first fiber channels being parallel to each other and the first fiber channels each having a center defined by its respective longitudinal axis, the centers of the first fiber channels being co-linear with each other, and wherein the overmolded body portion defines two second guide pin channels.

3. The overmolded alignment ferrule of claim 2 wherein each of the first guide pin channels has a center defined by its respective longitudinal axis, the centers of the first guide pin channels being co-linear with the centers of the first fiber channels.

4. The overmolded alignment ferrule of claim 2 wherein the precision portion defines a plurality of other first fiber channels being parallel to each other and each having a center defined by its respective longitudinal axis, the centers of the other first fiber channels being co-linear with each other.

5. The overmolded alignment ferrule of claim 2 wherein the distance between one of the first guide pin channels and one of the first fiber channels is substantially the same as the distance between the other first guide pin channel and the other first fiber channel.

6. The overmolded alignment ferrule of claim 1 wherein the precision portion has a generally rectangular block configuration.

7. The overmolded alignment ferrule of claim 1 wherein the precision portion includes at least one gripping member for engaging the overmolded body portion.

8. The overmolded alignment ferrule of claim 7 wherein the gripping member is a flange.

9. The overmolded alignment ferrule of claim 1 wherein the precision portion includes a rear face, the rear face being chamfered around the first guide pin channel and around each of the first fiber channels.

10. The overmolded alignment ferrule of claim 1 wherein the precision portion and overmolded body portion are constructed of different materials.

11. The overmolded alignment ferrule of claim 1 wherein the precision portion is comprised of a thermoset composite.

12. An overmolded alignment ferrule for a first fiber optic device used to couple a plurality of optical fibers contained therein to a second fiber optic device, the overmolded alignment ferrule comprising:

(a) a precision portion for aligning the optical fibers with the second fiber optic device, the precision portion comprising a generally rectangular block defining a plurality of first guide pin channels and a plurality of first fiber channels, each first guide pin channel adapted to receive a respective guide pin for mating with the second fiber optic device, and each first fiber channel receiving a respective one of the optical fibers, the first fiber channels each having a center defined by a longitudinal axis, at least some of the centers of the first fiber channels being co-linear with each other; and (b) an overmolded body portion for incorporating the alignment ferrule into the first fiber optic device and extending rearward from the precision portion, the overmolded body portion defining a plurality of second guide pin channels and a plurality of second fiber channels, each second guide pin channel being in communication with a respective one of the first guide pin channels, each second guide pin channel adapted to receive the respective guide pin, each second fiber channel in communication with a respective one of the first fiber channels and receiving the respective one of the optical fibers.

13. The overmolded alignment ferrule of claim 12 wherein each of the first guide pin channels has a center defined by its respective longitudinal axis, the centers of the first guide pin channels and the centers of the first fiber channels being co-linear with each other.

14. The overmolded alignment ferrule of claim 12 wherein the distance between one of the first guide pin channels and one of the first fiber channels is substantially the same as the distance between an other first guide pin channel and an other first fiber channel.

15. The overmolded alignment ferrule of claim 12 wherein the block includes a rear face, the rear face of the block being chamfered around each of the first guide pin channels and around each of the first fiber channels.

16. The overmolded alignment ferrule of claim 12 wherein the overmolded body portion includes a rear face, the rear face of the overmolded body portion being chamfered around each of the second guide pin channels and around each of the second fiber channels.

17. The overmolded alignment ferrule of claim 12 wherein the block includes a pair of flanges for engaging the overmolded body portion.

18. A method of producing an overmolded alignment ferrule for a first fiber optic device for coupling a plurality of optical fibers to a second fiber optic device, the method comprising the steps of:

(a) producing a precision portion defining at least one first guide pin channel for receiving a guide pin for mating the fiber optic devices and at least two first fiber channels, each first fiber channel for receiving a respective optical fiber; and (b) overmolding the precision portion to produce a body portion for incorporating the alignment ferrule into the first fiber optic device such that the body portion extends rearward from the precision portion and defines at least one second guide pin channel in communication with the first guide pin channel and at least two second fiber channels, the second guide pin channel for receiving the guide pin and each second fiber channel being in communication with a respective one of the first fiber channels for receiving the respective optical fiber.

19. The method of claim 18 wherein step (a) includes using the first guide pin channel as datum for defining the first fiber channel with precision.

20. The method of claim 19 wherein step (a) includes defining at least two first guide pin channels in the precision portion and step (b) includes defining at least two second guide pin channels in the body portion.

21. The method of claim 20 wherein step (a) includes defining the first guide pin channels and the first fiber channels such that each of the first fiber channels has a center defined by its respective longitudinal axis and at least some of the centers of the first fiber channels are co-linear with each other.

22. The method of claim 21 wherein step (a) includes defining the first guide pin channels and the first fiber channels such that each of the first guide pin channels has a respective longitudinal axis and the centers of the first guide pin channels and the centers of the first fiber channels are co-linear with each other.

23. The method of claim 21 wherein step (a) includes defining the first guide pin channels and the first fiber channels such that the distance between one of the first guide pin channels and one of the first fiber channels is substantially the same as the distance between the other first guide pin channel and the other first fiber channel.

24. The method of claim 19 wherein step (a) includes defining the diameter of the first guide pin channels with precision such that the diameters of the first guide pin channels also function as the datum for defining the first fiber channels with precision.

25. The method of claim 19 wherein step (a) includes producing the precision portion by mold.

26. The method of claim 19 wherein step (b) includes producing the body portion by injection mold.

27. The method of claim 19 wherein step (b) includes using the first guide pin channel as datum for defining the second guide pin channel and the second fiber channels.

\* \* \* \* \*